United States Patent

[11] 3,601,793

| | | |
|---|---|---|
| [72] | Inventor | Anthony K. Otto<br>Ann Arbor, Mich. |
| [21] | Appl. No. | 829,635 |
| [22] | Filed | June 2, 1969 |
| [45] | Patented | Aug. 24, 1971 |
| [73] | Assignee | Chrysler Corporation<br>Highland Park, Mich. |

[54] LOW FUEL LEVEL WARNING AND GAUGING SYSTEM
11 Claims, 5 Drawing Figs.

[52] U.S. Cl. .................................................. 340/59
[51] Int. Cl. ................................................... B60q 1/00
[50] Field of Search ............................. 340/59, 52, 244 B; 180/103

[56] References Cited
UNITED STATES PATENTS
2,835,885  5/1958  Boddy ........................... 340/59
3,403,376  9/1968  Kraft et al. ..................... 340/59

Primary Examiner—John W. Caldwell
Assistant Examiner—Glen R. Swann, III
Attorney—Harness, Talburtt and Baldwin ABSTRACT: A low fuel level signalling arrangement for a vehicle fuel level gauging system of the constant voltage regulated type. A current responsive relay element is connected between the vehicle battery and the input to the instrument regulator, the regulated output voltage of which is applied to the series combination of a conventional electrothermal fuel gauge and its control unit connected in a single line, ground-returned electrical circuit. The relay operates a switching circuit controlling the energization of a signal lamp which the fuel level diminishes to a predetermined level and includes a biasing or lock-in means for maintaining the switching circuit in operated condition to prevent flickering of the signal lamp.

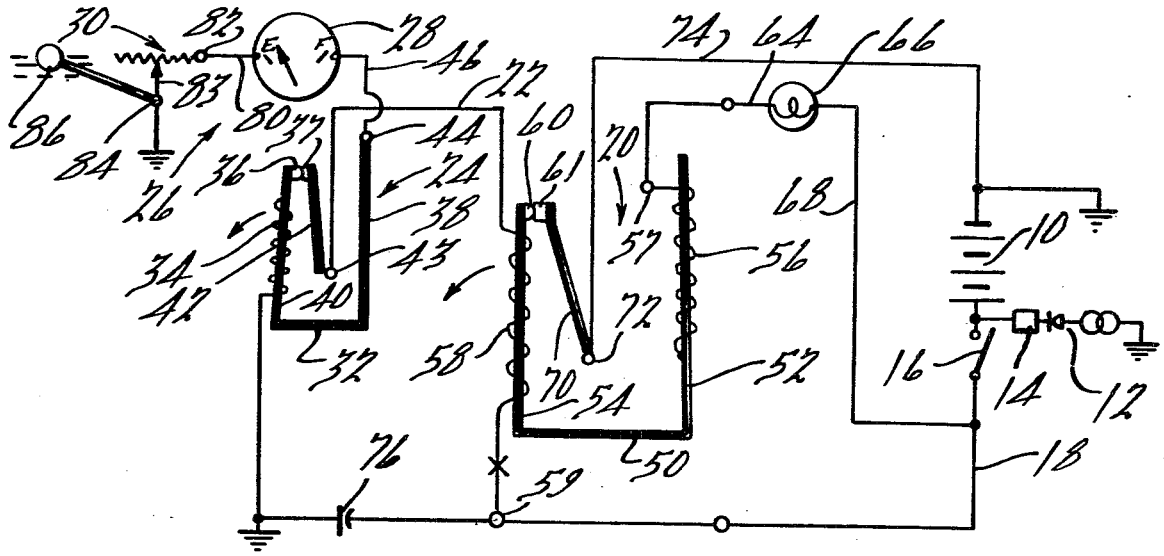

PATENTED AUG 24 1971

3,601,793

LOW FUEL LEVEL WARNING AND GAUGING SYSTEM

BACKGROUND OF THE INVENTION

This invention relates to signal warning and gauging systems of the type adapted to provide a warning signal in the event a variable physical condition being gauged attains a predetermined level.

As applied to an automobile fuel level gauging system, the invention provides a warning signal indication of an impending fuel depletion condition so as to alert the attention of the operator to inspect the fuel gauge displaying the actual fuel level content condition of the vehicle.

The invention seeks to provide a signal warning system of the above character which is of simple and inexpensive construction and may be used with existing instrument gauging systems without altering the parameters and construction of the gauge and/or control elements, nor disrupting the circuit wiring therefor.

A related object is to provide a signal warning arrangement of the above character that is suitable for use with constant voltage type gauging systems which may be retrofitted to accommodate the signalling apparatus without affecting the parameters, construction and wiring of the existing instruments.

Yet another object is to provide a gauging and signal warning system using a single wire or series type wiring circuit and standard two-terminal gauging and control elements.

Another object is to provide a gauging and signal warning system for a constant voltage gauging system wherein the operation of the gauging element is unaffected by the presence of the signal detecting element in the system.

A specific object is to provide a gauging and signal warning system for a constant voltage gauging system wherein the operation of the gauging element and its associated control element is unaffected by changes in the voltage drop across the signalling element with changes in the current drawn by the gauging system.

Other objects are to provide a signal warning system of the above character including biasing or lock-in means to prevent intermittent or flickering operations of the signal warning device at marginal or incipient conditions when the condition being monitored is passing through the warning signal level.

The above and other objects, together with the features and advantages attending the present invention will appear more fully from the detailed description following the accompanying drawings

DESCRIPTION OF THE DRAWINGS

FIG. 1 is a schematic electrical circuit diagram of a low fuel level signal warning and gauging system in accordance with the present invention;

FIG. 2 is a top plan view with cover removed and parts broken away of a signal warning and voltage regulator construction for a signal warning and gauging system in accordance with the present invention;

FIG. 3 is a bottom plan view of the construction of FIG. 2;

FIG. 4 is a side elevation view taken in the direction 4—4 of FIG. 2; and

FIG. 5 is a side elevation view taken in the direction 5—5 of FIG. 2.

DESCRIPTION OF PREFERRED EMBODIMENT

With reference to the drawings, FIG. 1 illustrates a gauging and warning signal system in accordance with the present invention as employed in and applied to an automotive vehicle equipped with an electrical power source which includes a storage battery 10 in addition to the vehicle engine-driven generator or alternator 12. In line with conventional automotive practice, an automotive type voltage regulator 14 is interposed between the generator or rectified output of the alternator to maintain the output voltage thereof between limits.

The battery is shown connected in a negatively grounded or ground-returned wiring system, with the positive side or terminal of the battery connected through the vehicle ignition switch 16 and then over conductor 18 to a current responsive signal relay element 20. The relay element is connected over conductor 22 in circuit with an instrument regulator 24 for the vehicle gauging system 26 comprising a current responsive gauging element 28 and a remotely located, variable control element 30.

The illustrated gauging system is of the constant voltage type employing electrothermal indicating gauges and simple rheostatic sending elements and requires the application of a constant voltage to the serial combination of the gauge and its associated sending or control unit. Although the voltage of the battery is regulated by the automobile voltage regulator of the battery charging circuit, the battery voltage may still fluctuate between limits, which, while acceptable for many of the vehicle requirements, are not sufficiently close for satisfactory operation of desirably simple electric gauges. Accordingly, it is the function of the instrument regulator 24 to maintain the voltage applied to the gauging system at a level substantially independent of such fluctuations of the vehicle electrical power source.

The regulator 24 may be of the type shown in U.S. Pat. No. 2,833,889 and is shown as including a thermally responsive, electrical conductive polymetallic element 32, a heater winding 34 and a pair of current modulating contacts 36, 37. The element 32 is shown as of U-shaped formation having a fixed leg 38 and a movable leg 40 of which the movable leg carries the heater winding 34 and the contact 36. One end or terminal of the heater winding 34 is grounded, and its other end or terminal is electrically connected to the movable leg 40, the contact 36 on which normally engages the fixed contact 37. Contact 37 is mounted on one end of an adjustable, electrically conductive strip 42 having a terminal 43 at its other end constituting the input of or to the regulator. The regulated output of the regulator appears between the movable contact 36 and ground and is taken from terminal 44, which is located at one end of the fixed leg 38 and is at the same electrical potential as contact 36, over conductor 46 connected to one side of the gauge element 28.

The stationary contact 37 of the regulator is connected through strip 42 and terminal 43 and over circuit conductor 22 to the current relay element 20 which is interposed or connected between the input to the voltage regulator 24 and the vehicle storage battery. The relay comprises a thermally responsive, electrically conductive bimetallic element 50, shown as being of U-shaped formation, having a fixed leg 52 and a movable leg 54, a pair of heater windings 56 and 58 each carried on a different one of the legs 52 and 54, respectively, and a pair of normally-closed relay switching contacts 60 and 61. Heater winding 58, carried on the movable leg 54 of the element 50, is connected at one end or terminal 59 over conductor 18 to the positive side of the vehicle battery and at its other end over conductor 22 to the input terminal 43 of the voltage regulator 24.

The other heater winding 56 of the current relay 20 is carried on the fixed leg 52 and is connected at one end to the element 50. The other end or terminal 57 of winding 56 is connected over conductor 64 to one side of a signal device, such as a lamp 66, the other side of which is shown connected over circuit conductor 68 to the load side of the ignition switch 16. Contacts 60 and 61 of the signal relay are shown in their normally closed position with movable contact 60 biased by leg 54 against stationary contact 61. Contact 61 is carried on and is located at one end of an adjustable, electrically conducting strip element 70, the other end or terminal 72 of which is shown connected to ground over circuit conductor 74. For a one wire or grounded lamp socket arrangement, conductors 74 and 68 would be connected to potential levels opposite that shown.

Connected effectively in parallel with the series combination of the heater winding 58 of the signal relay 20 and the contacts 37, 36 and grounded heater coil 34 of the instrument regulator 24 is an arc suppressing filter element, shown as a condenser 76, for filtering of any radio frequency interference generated by the continual opening and closing of the current modulating contacts 36, 37 of the instrument regulator. Alternatively, the filter element could be connected between terminal point 43 and ground, and, in another instance may be replaced by an inductive type element, as an rf choke coil connected from terminal point 59 in series with and on the input side of the heater winding 56.

The gauging system 26 is illustrated as the vehicle fuel gauging apparatus of which the gauge 28 is of the electrothermal variety shown in U.S. Pat. No. 2,625,132 and its associated sending or control unit 30 is shown in U.S. Pat. No. 2,873,205. The side or terminal of the gauge opposite its terminal connected to the instrument regulator 24 is connected over circuit conductor 80 to one side or terminal 82 of the control unit 30, shown as a simple two terminal rheostatic element. The other terminal 84 of the control unit is connected to or taken from its potentiometer type arm 83, which is electrically grounded and is mechanically coupled to and is continuously adjustably or variably positioned by a float element 86 in the vehicle fuel tank.

FIGS. 2 through 5 illustrate the mechanical structural organization of a combined form of instrument voltage regulator and signal relay both contained within a common case or housing and supported on a common insulating base 92 having four spade, prong type standoff terminals thereon corresponding to the terminal points 44, 57, 59 and 72 of the circuit of FIG. 1. The components of the regulator and of the relay bear corresponding identifications by which they are designated in FIG. 1, it being noted that conductor 22 is contained within the housing and is a continuation of the relay heater winding 58 connected to terminal 43 at the end of the adjustable conductive strip portion 42 of regulator 24.

As best shown in FIGS. 3 and 4, an adjustable screw 94, accessible from the exterior of the housing and extending through the insulating base support 92 is provided to control the setting of the voltage regulator current modulating contacts 36, 37 for adjustment of the output voltage level thereof. The corresponding adjustable conductive strip portion 70 for the signal relay 20 is located below the movable leg 54 of the relay element 52 shown broken away in FIG. 2. As best seen in FIG. 5, strip 70 is also provided with an adjustable screw 96 for setting the point at which the relay switching contacts 60, 61 separate for the current corresponding to the selected level of fuel at which the warning signal is to be emitted or provided.

The condenser filtering element 76 is contained internally of the housing and has a rated capacitance value of 0.5 uf$_\mu$ at 200 V. One lead of the condenser is connected in common with one end of the heater coil 58 to an internal standoff terminal 98 riveted to terminal 59 for connection to the ignition switch. The other lead of the condenser is connected to an internal standoff terminal 500 in common with the grounding end of the heater coil 34 of the regulator. Terminal 100 is connected to conductive strip 102, which makes contact with the cover 90 of the structure for case ground.

OPERATION

In operation, with the ignition switch 16 closed, the gauging system is electrically activated by current flow over a circuit traced from the positive terminal of the battery through the ignition switch 16, conductor 18, the heater winding 58 of the signal relay, conductor 22, contacts 37, 36 and element 32 of the instrument regulator, conductor 46, fuel gauge 28, conductor 80 and control element 30 back to the negative or grounded side of the battery. With, say, a full tank of fuel in the vehicle, the control element is positioned by the float at its lowest or minimum resistance setting, and draws a maximum current through the signal relay heater coil 58, which is wound around the movable leg 54 and is in direct heat transfer relation therewith. Leg 54 is thus heated and is deflected or displaced in the indicated direction to separate or open the relay contacts 60, 61 and interrupt the ground return circuit for the warning signal circuit.

When the fuel level diminishes to a predetermined range or level of, say, 3 to 4 gallons, the movable arm 83 of the control unit has been positioned by the float to increase the resistance presented by the control unit in the gauging circuit. The current through the above traced circuit will have decreased to a value at which the heating effect of the current through the relay winding 58 is insufficient to maintain the contacts 60, 61 separated. The switch contacts thus closed, resulting in completion of a grounding or return circuit for the warning lamp 66 and energization of the lamp over a circuit traced from the positive side of the battery, the ignition switch 16, conductor 68, lamp 66, conductor 64, auxiliary winding 56 and element 50 of the signal relay, the now closed contacts 60, 61, and circuit conductor 74 back to the negative side of the battery.

The current flow through the auxiliary heating winding 56 of the signal relay heats the leg 52 of the bimetal element 50 thereof to bias and deflect the structure in a direction that assists the closing of the switching contacts 60, 61, thereby preventing flickering of the warning lamp at current levels at which the contacts 60, 61 just begin to close.

It will be seen that the instrument regulator 24, gauge 28 and sending unit 30 are effectively connected in a single wire series circuit in the customary order and manner in which these elements are connected in existing vehicles.

In accordance with one aspect of the invention, the signal relay 20 is connected on the input side of the instrument voltage regulator and between the regulator and the power source 10 so as not to affect the regulator output voltage, which is maintained constant thereby at substantially 5.0 volts for supplying the gauging element and its associated sender unit. By locating the signal relay electrically anteriorly of the voltage regulator and the gauging elements of the described constant voltage gauging system, the actuating element or heating coil 58 of the signal relay is subjected to the combined heating effects of the component of current actuating the voltage regulator, i.e. the current shunted through the heating coil 34 of the regulator, and the remaining component of current supplied to the gauging circuit. The signal relay thus has a greater response characteristic and sensitivity to changes in the fuel level and can be set more accurately than an arrangement in which the relay element 20 were connected between the output of the regulator 24 and the input to the gauging circuit. In the latter case, the signal relay would not be subjected to the component of current consumed by the regulator.

Moreover, the voltage drop across the signal relay coil 58, which has a finite resistance of about 7 ohms, would also in the latter case, reduce the voltage available to the gauge element and sending unit, thereby changing the heating effect, related to $E^2/R$, supplied to the thermal element of the gauge 38 and would further affect the resulting accuracy of the gauging system. This would require modification of the parameters and/or design of the control unit and/or gauge as by reducing the resistance value of the sending unit by the amount of the resistance of the relay coil 58 or would require a continuously variable compensation for the gauge throughout its indicating range. The character and nature of the compensation required may be appreciated from consideration of the relative resistance values of the gauge and sending element of which the gauge resistance is about 15 ohms and the sender varies from 10 to 73 ohms, depending upon the fuel level.

In distinction, the present arrangement does not inject the voltage drop of the fixed impedance signal relay element 20 into the constant voltage portion of the gauging system. It thus permits the use of the same standard two terminal gauging and sending elements employed vehicles not equipped with the subject low-level warning system and, moreover, may be added to a vehicle in which these elements are already installed without the necessity of replacement thereof.

The signal relay and warning lamp circuit may be installed in an existing single wire vehicle gauging system, which may be retrofitted without disruption of the vehicle wiring to incorporate low level fuel warning indicator in accordance with the present invention simply by replacing the existing instrument voltage regulator with the precalibrated combined structure of FIGS. 2-5. The terminal 59 of the combination voltage regulator and signal relay device would be connected to the existing lead 18 from the ignition switch, and terminal 44 to the existing lead 46 connected to the gauge 28. The lamp circuit is then connected by running a parallel wire connection from the ignition switch to one side of the lamp 66, the other side of which is connected over series conductor 64 to the lamp terminal 57 of the combination structure whose common terminal 72 is either connected over a separate conductor 74 back to the negative side of the vehicle battery or directly to ground.

The lamp 66 could be a preexisting signal warning lamp, such as the emergency brake-on actuated signal lamp already provided on some vehicles. In such case the conductor 64 from terminal 57 is simply and conveniently connected to the low potential or grounding side of the lamp, the lamp energizing circuit then being completed over a circuit through the biasing heater coil 56 and relay switching contacts 60, 61 to ground and in parallel with the hand brake actuated grounding switch (not shown).

While the invention has been described with reference to a fuel gauging system, it is apparent that the principles thereof are applicable to other forms of gauging systems including oil pressure, engine temperature and the like.

What is claimed is:

1. A gauging and signal warning system for a vehicle equipped with a source of electrical power exhibiting a variable voltage characteristic and connected at one side to electrical ground potential, said system comprising the combination of
   a voltage regulator element operable to produce a regulated output voltage therefrom substantially independent of variations of input voltage applied thereto,
   a current responsive gauging circuit connected to receive the regulated output voltage of said voltage regulator element and including
   a current responsive gauging element variously responsive to a variable current therethrough and
   a single-line ground returned sender unit having only two electrical circuit connections thereto and including a resistance element connected in series over one of said electrical circuit connections to said gauging element, a wiper arm movable along said resistance element in accordance with changes in the physical condition being gauged and connected over the other of said electrical circuit connections to electrical ground potential and conducting only the current of said gauging element therethrough, and
   a current responsive signal element subjected to the current flow through said gauging circuit and operable to produce a signal warning action in the event the current flow therethrough reaches a predetermined value, said signal element connected in series between said source and the voltage regulator, whereby the voltage supplied to the gauging element and control element is unaffected by changes in the voltage drop across the signal element with changes in the current drawn by the gauging system.

2. A gauging and signal warning system in accordance with claim 1 wherein said signal element is also subjected to the total current flow through said voltage regulator element.

3. A gauging and signal warning system in accordance with claim 1 wherein said signal element presents a fixed impedance to the gauging system.

4. A gauging and signal warning system in accordance with claim 1 wherein said gauging element and said control element are the fuel gauge and its associated variable sender of a fuel gauging system.

5. A gauging and signal warning system in accordance with claim 1 wherein said voltage regulator element includes a current utilizing heating section the current through which also flows through the signal element.

6. A gauging and signal warning system in accordance with claim 1 wherein said signal element includes a heating coil connected at one side to one side of said vehicle power source and subjected to the total current flow through said voltage regulator element and said gauging element, a bimetal member in heat transfer relation with said heating coil, a pair of switching contacts including a stationary contact and a contact movable by said bimetal member into engagement with said stationary contact when the current through said signal element heating coil reaches a predetermined level, and an electrically energizable signal device connected through said pair of contacts for energization from said vehicle power source when said movable contact is in engagement with stationary contact.

7. A gauging and signal warning system in accordance with claim 6 wherein said voltage regulator element includes a heater coil, a polymetallic member in heat transfer relation with said heater coil, a stationary contact connected to the other side of said heater coil of said signal element, and a contact mechanically biased against said stationary contact and movable by said polymetallic member into and out of contact with said stationary contact in accordance with the average heating value of the current supplied to the voltage regulator heater coil, said movable contact and one side of said regulator heater coil connected to said gauging element and the other side of said regulator heater coil connected to the said other side of the vehicle power source.

8. A gauging and signal waring system in accordance with claim 7 wherein the current through said heater coil of said signal element includes the current through said heater coil of said voltage regulator element and the current through said gauging element and its associated sender member.

9. A gauging and signal warning system in accordance with claim 1 wherein said signal element includes a first heating coil connected at one side to one side of said vehicle power source and subjected to the current flow through said gauging element, a bimetal member in heat transfer relation with said first heating coil, a stationary contact connected to the other side of the vehicle power source, a contact movable by said bimetal member into engagement with said stationary contact when the current through said gauging element reaches a predetermined level, a second heating coil in heat transfer relation with said bimetal member and connected at one side to the movable contact of said signal element, and an electrically energizable signal device connected at one side to the other side of said second heating coil and at its other side to the said one side of said vehicle power source.

10. A low fuel level signalling system for a vehicle equipped with an electrically grounded source of electrical power and a constant voltage type gauging system having a voltage regulator providing a regulated output voltage therefrom substantially independent of fluctuations of the voltage of the vehicle power source, a current responsive gauging element variously responsive to a variable current flow therethrough, and a two terminal variable impedance control element responsive to a physical condition of the vehicle and serially connected in current controlling circuit relation with said gauging element across the regulated output of said voltage regulator element to vary the flow of current through the gauging element in accordance with variations in the physical condition being gauged, said signalling system including a current responsive signal element serially connected between the vehicle power source and the voltage regulator, a switching circuit operated by the signal element when current flow through said signal element reaches a predetermined value, and a signal device connected to the power source for energization therefrom through said switching circuit operated by said signal element, said control element having only two electrical circuit connections thereto including an electrical circuit connection between it and said gauging element and another electrical circuit connection between it and electrical ground and conducting only the current of said gauging element therethrough.

11. A low level fuel signalling system in accordance with claim 10 wherein said signalling system further includes a biasing element activated when the switching circuit is operated to maintain the energization of the signal device.